April 15, 1969 R. T. GRANNELLS 3,439,206
BRUSH FOR ELECTRICAL DEVICES
Filed Aug. 31, 1965

INVENTOR
RICHARD T. GRANNELLS

United States Patent Office 3,439,206
Patented Apr. 15, 1969

3,439,206
BRUSH FOR ELECTRICAL DEVICES
Richard T. Grannells, 120 Standish Place,
Mamaroneck, N.Y. 10543
Filed Aug. 31, 1965, Ser. No. 484,039
Int. Cl. H02h 13/00; H01r 39/18
U.S. Cl. 310—247                3 Claims

ABSTRACT OF THE DISCLOSURE

An electrical brush having a non-abrasive insulating portion a predetermined distance from the working end of the brush. The brush is connected to its power through or around the insulation such that when the brush wears down the connection rapidly burns away leaving only the insulation contacting the moving surface.

---

The invention relates to electrical devices having moving parts and more particularly to brushes for maintaining electrical contact between one part of an electrical device which moves in relation to another part.

Brushes are used in many electrical devices; for example in a motor the brushes maintain electrical contact between the rotor and the stator. Usually the brushes are held in place by a brush holder which positions the brush, and a retaining spring which urges the brush against the rotor.

The brush itself is made of a soft conductive material such as carbon, in order to avoid abrasive damage to the rotor by the working end of the brush. Contact with the stator is maintained through the spring which contacts the non-working end of the brush. Some brushes have a conductor embedded a short distance into the non-working end of the brush, and contact with the stator is through this conductor.

Brushes eventually wear out and must be replaced. Frequently, however, a brush is allowed to wear to its end, and the retaining spring or the embedded conductor is exposed to the rotor. The spring or conductor causes severe damage to the rotor, and replacement is necessary. To avoid this damage it is desirable to have the motor stop before the brush has worn to the point where the spring or conductor is exposed.

Devices already exist which will cause a motor to stop when a brush has worn to a predetermined length. However, these prior devices have not found wide use because they require not only a modified brush, but also a special brush holder in the motor.

It is therefore a paramount object of this invention to provide an improved electrical brush which will interrupt the current there-through when the brush has worn to a predetermined length.

It is also an object of this invention to provide a current interrupting brush which requires no modification to existing brush holders.

Briefly, the above objects are accomplished in accordance with the invention by providing a brush with a non-abrasive insulating portion a predetermined length from a surface contacting the working end of the brush, so that when the predetermined length has worn away, only the insulating portion contacts the surface. Electrical contact is maintained beyond the insulating portion by means of a conductive joint extending through or around the insulating material.

The invention has the advantage of being simple but effective. No modification of existing brush holders need be made to practice the invention. Only the brush itself is modified.

A further advantage is that existing brushes may be easily modified to practice the present invention. Brushes manufactured in accordance with the invention may be readily substituted for existing brushes in appliances such as electric drills, saws, lawn mowers, vacuum cleaners, food mixers and the like. More expensive industrial equipment may also be protected from damage by practicing the invention.

The foregoing and other objects, features and advantages of the invention will be apparent from the following description of preferred embodiments of the invention, as illustrated in the accompanying drawings, in which.

Figure 1:
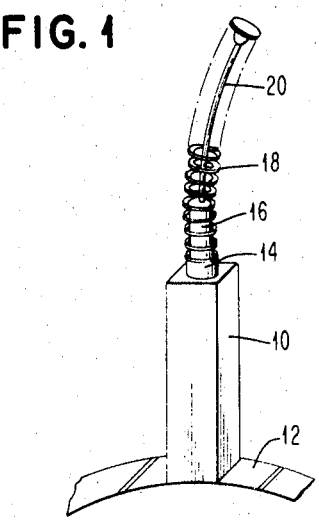
FIGURE 1 is a perspective view of one embodiment of the invention, wherein a brush is shown in contact with a rotor.

Referring now to FIGURE 1, a brush 10 made of suitable conductive material (such as carbon) is shown in contact with a moveable surface 12, which may be the commutator of an electric motor. The brush is held in position by a brush holder, which is not shown.

Figure 2:
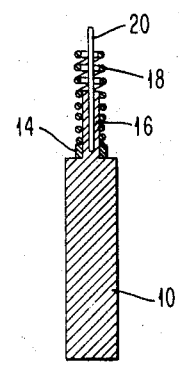
FIGURE 2 is a cross-sectional view of the brush shown in FIGURE 1.

An insulating sleeve 14 is slipped over the projection 16. The insulating sleeve may be made of any suitable non-abrasive non-conducting material (such as phenolic). A helical spring 18 engaging the projection 16 urges the brush in contact with the moveable surface 12. A wire conductor 20 is shown embedded into the projection 16, but does not (as shown clearly in FIGURE 2) extend beyond the insulating sleeve 14. The use of a conducting wire is optional, as electrical connection between the brush and other parts of the motor may be made through the spring 18.

The invention operates in the following manner. The brush 10 is placed in a brush holder and is held in contact with the rotor 12 by means of the spring 18, which urges the insulating sleeve 14 into contact with the brush 10, and hence the brush into contact with the rotor.

Figure 3:
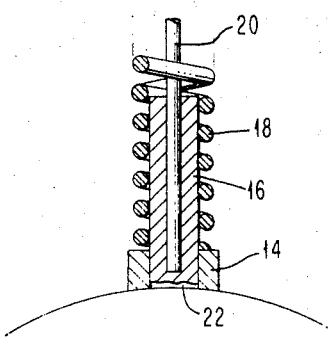
FIGURE 3 illustrates the brush of FIGURE 1 after it has worn from prolonged use.

When the brush has worn away only the insulating sleeve 14 contacts the rotor 12, as shown in FIGURE 3. The portion 22 of the brush extending through the sleeve 14 is rapidly burned away so that all contact by the conducting material is interrupted, thus causing the motor to stop. The brush can then be replaced. Since the wire 20 does not extend beyond the sleeve 14, there is no danger of its being exposed and damaging the rotor 12.

Figure 4:
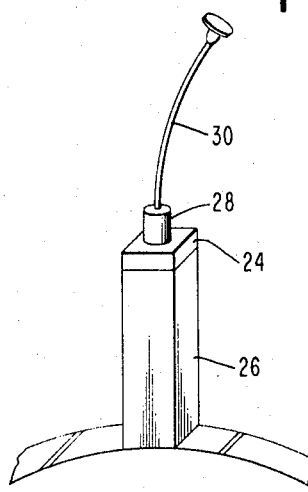
FIGURE 4 is a perspective view of a second embodiment of the invention.

FIGURE 4 shows a second embodiment of the invention wherein the insulating position or sleeve 24 has the same shape as the brush 26 and contact is maintained through the insulation by means of the projection 28. The wire 30 embedded in the brush does not extend beyond the insulation 24 into the working end of the brush. In this embodiment the insulating portion 24 may be made of phenolic and press-fitted over the projection or the insulating portion may be formed in a mold by using epoxy plastic or other suitable material.

Figure 5:
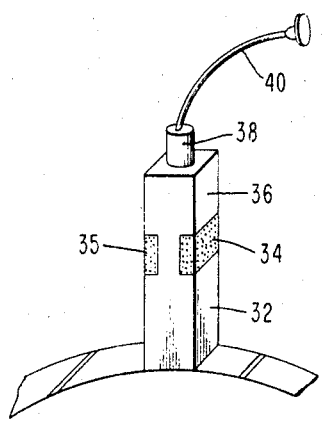
FIGURE 5 is a perspective view of a third embodiment of the invention.

FIGURE 5 shows still a further embodiment of the invention. The insulating portions 34, 35 may be formed by use of a mold and plastic material or by gluing or press-fitting phenolic or other insulating material into grooves cut into the brush body 32. The insulating portions 34, 35 may also be formed so as to encircle the entire brush body, if desired, leaving only a connecting portion passing through the insulation to connect the working portion 32 with the non-working portion 36. A wire 40 may be embedded in the brush through projection 38 into the non-working portion 36 and into the connecting portion but not beyond the insulation into the working portion 32.

While the invention has been shown and described with reference to preferred embodiments thereof, it will be understood by those skilled in the art that the foregoing and other changes in form and details may be made therein without departing from the spirit and scope of the invention.

What is claimed is:
1. A unitary electrical brush structure comprising:
   a single brush body of a rapidly distintegrating conducting material having a working face and opposite said working face a non-working face,
   said non-working face comprising a projection of said brush body from said non-working face, a conducting wire embedded in said projection adapted to make electrical contact with an electrical power source, and
   a slowly disintegrating insulating material interposed between said working and non-working faces, and
   a connecting portion extending past said insulating material connecting said working and non-working faces together, whereby when the working face of said brush has worn to the insulating material, the brush material rapidly disintegrates causing the electrical current through the brsuh to be interrupted.
2. Claim 1 above wherein said insulating material is affixed to a groove cut into the body of said brush.
3. Claim 1 above, wherein said insulating material conforms substantially to the shape of the outer dimensions of said brush body.

References Cited
UNITED STATES PATENTS

| | | | |
|---|---|---|---|
| 2,870,355 | 1/1959 | Rohrbach | 310—247 |
| 1,821,405 | 9/1931 | Riese | 310—248 |
| 2,382,799 | 8/1945 | Leach et al. | 310—247 |

FOREIGN PATENTS 256,978  Great Britain.

ORIS L. RADER, *Primary Examiner.*

G. NUNEZ, *Assistant Examiner.*

U.S. Cl. X.R.

310—249